Patented Mar. 4, 1952

2,587,861

UNITED STATES PATENT OFFICE 2,587,861

PREPARATION OF BENZIDINE SULFATE

William S. Krause, Pitman, N. J., assignor to E. I. du Pont de Nemours & Company, Wilmington, Del., a corporation of Delaware No Drawing. Application March 13, 1951, Serial No. 215,373

2 Claims. (Cl. 260—579)

This invention relates to an improved process for the preparation of benzidine sulfate.

As illustrated in U. S. Patent 2,233,128, dated February 25, 1941, benzidine is usually prepared on a commercial scale by the reduction of nitrobenzene either by the use of zinc dust and caustic soda or by catalytic hydrogenation of the nitrobenzene in the presence of various catalysts. In general, in the preparation of benzidine sulfate it has been the practice to first isolate the benzidine in the form of the hydrochloride which after isolation and washing is then converted to the sulfate by procedures such as illustrated in Example 1 of the above mentioned patent.

Benzidine sulfate is an intermediate employed in the preparation of various azo dyes, and for certain dyes of this class it has been found that the benzidine sulfate cannot contain more than 0.5% of aniline including benzidine isomers calculated as aniline, which total impurities are generally referred to hereinafter as aniline. As illustrated in U. S. Patent 2,233,128 the major portion of the aniline can be eliminated by first isolating the benzidine hydrochloride which after preliminary purification can then be converted to the sulfate to give a benzidine sulfate of satisfactory grade. The isolation of the benzidine hydrochloride adds considerable time and cost to a process for preparing benzidine sulfate.

In the precipitation of the benzidine sulfate from solutions of the benzidine hydrochloride with sulfuric acid, apparently because of the insolubility of the benzidine sulfate in the dilute acid solution, a considerable amount of the impurities contained in the benzidine hydrochloride are occluded in the sulfate during the precipitation, and, while it has been found possible to reduce the amount of contamination in the sulfate by carrying out the precipitation in more dilute solutions, the volume of such dilute solutions becomes excessive and uneconomical.

To avoid these difficulties it has been suggested that benzidine sulfate be prepared directly from the hydrazobenzene by inversion with a limited amount of hydrochloric acid followed by the gradual addition of sulfuric acid to form the benzidine sulfate. It has been theorized that such process, which involves zinc reduction, forms smaller quantities of aniline as an impurity than the catalytic processes, but analysis shows that the zinc reduction does not give benzidine hydrochloride of the necessary purity that can be converted directly with sulfuric acid to benzidine sulfate of a quality satisfactory for use in the manufacture of certain dyes.

It is an object of the present invention to provide a simple and economical process for preparing benzidine sulfate from a crude benzidine hydrochloride. It is a more specific object of the invention to provide a method whereby a benzidine hydrochloride obtained by the catalytic reduction of nitrobenzene in an oxygen containing non-acidic organic solvent may be isolated directly as benzidine sulfate of a purity satisfactory for use generally in the preparation of azo dyes and which therefore contains less than 0.5% of aniline. It is a further object of the invention to provide a process for precipitating benzidine sulfate in a state of high purity from relatively concentrated solutions of benzidine hydrochloride.

In the catalytic hydrogenation of nitrobenzene to produce benzidine according to U. S. Patent 2,233,128, the hydrogenation is carried out in an oxygen containing non-acidic organic solvent such as alcohols, etc., from which benzidine hydrochloride is precipitated. Isopropyl alcohol is the alcohol commonly employed and the hydrazobenzene which is produced during the hydrogenation is inverted to the benzidine hydrochloride by the addition of hydrochloric acid after hydrogenation is completed.

While the present invention is not to be limited to the formation of benzidine sulfate from impure benzidine hydrochloride that has been prepared by the particular process of hydrogenation described in U. S. Patent 2,233,128, it will be illustrated more particularly with reference to that process. Benzidine hydrochloride prepared by any process which contains an amount of aniline higher than that which can ordinarily be present during the precipitation with sulfuric acid to produce benzidine sulfate having an aniline content less than 0.5%, can be purified by the process as hereinafter described. The process is applicable for the preparation of benzidine sulfate of high purity from benzidine hydrochloride which may even contain small amounts of impurities.

According to the present invention, a solution of benzidine hydrochloride in water, which may also contain the isopropyl or other alcohol employed in its preparation, hydrochloric acid, aniline hydrochloride and to a lesser extent the normally occurring isomeric forms of benzidine, is salted with sodium chloride or other salt, the sulfate of which is soluble in water, so as to substantially completely precipitate the benzidine present in the solution as benzidine hydrochloride. In the salting procedure the aniline hydrochloride and isomeric compounds do not precipitate to any appreciable degree under the conditions employed, and the benzidine hydrochloride is precipitated in the form which does not occlude excessive quantities of these impurities. To this slurry there is then added a mixture of sulfuric and hydrochloric acids to convert the benzidine hydrochloride to benzidine sulfate. The benzidine sulfate is then isolated by filtration and washed with water to remove the mother liquor. By this procedure the conversion of the benzidine hydrochloride to the sulfate is apparently slowed down by the presence of the hydrochloric acid to such an extent that any occlusion of aniline hydrochloride, sulfate or other foreign materials is reduced to an extremely low percentage.

To obtain benzidine sulfate in high yields and high purity, it is desirable that the benzidine hydrochloride is substantially completely precipitated by the salting-out process in the crude solution of impurities at temperatures of 60° C. or higher. The addition of the sulfuric-hydrochloric acid mixture is also preferably carried out at temperatures of 60° C. or higher, and the rate of addition of this acid mixture should be relatively slow so as to avoid localized high concentration of the sulfuric acid during its addition. The preferred temperatures for these operations is from 60° to 70° C.

Temperatures above 70° C. may be employed in aqueous solutions or where solvents having higher boiling points than the isopropyl alcohol are used or where the reaction is carried out in reactors provided with condensers or other means to avoid loss of the volatile solvent.

Since the aniline content of the resulting material becomes greater where the precipitation is carried out below 60° C., it is desirable that the temperature employed in the precipitation of the benzidine hydrochloride and its conversion to the sulfate be at temperatures of 60° C. or above. The use of temperatures materially above 70° or 80° C. does not add to the efficiency of the process and are therefore not necessary.

The concentration of the crude benzidine hydrochloride solution should preferably be maintained between 9 to 12 parts of water per part of benzidine, for at concentrations greater than 1 to 9 the paste becomes viscous and difficult to handle economically, while concentrations below 1 part to 12 parts cause the process to become uneconomical due to excessive amounts of salt being required for salting-out, and the excessive quantities of liquid which must be handled. It should be recognized, however, that these concentrations are not critical but are given to illustrate the preferred conditions from an economical standpoint.

Other salts which produce soluble sulfates may of course be employed in place of sodium chloride, such as sodium bromide, potassium chloride, etc.

For the best results the benzidine hydrochloride should be completely precipitated prior to the addition of the hydrochloric-sulfuric acid mixture. This may be determined by withdrawing a sample from the mass, cooling it to 20°–25° C., filtering and then adding salt to the filtrate. The absence of further precipitation indicates that the salting-out is complete. Usually complete precipitation will be effected in a brine solution containing from 10% to 15% of salt, based on the water or mixture of water and alcohol present. Reasonable amounts of salt in excess of that needed to make a 15% brine solution are not harmful but are not necessary for the efficient operation of the process.

Ordinarily, from 0.6 to 1.0 part of sulfuric acid is required to convert one part of the benzidine hydrochloride to the sulfate. To prevent localized high concentrations of sulfuric acid the use of relatively dilute solutions is preferred such as sulfuric acid of from 30% to 40% concentration. To this aqueous sulfuric acid solution there is added from 0.2 to 0.5 part of hydrochloric acid per part of sulfuric acid contained in the solution. This range will usually provide adequately for variation in the amount of aniline impurities in the crude benzidine. As little as 0.1 part of hydrochloric acid per part of sulfuric acid may be employed. While amounts higher than those specified above can be used, they are not usually required. To convert one part of benzidine hydrochloride to the sulfate it is usually sufficient to use from 2 to 2.5 parts of a 30% to 40% aqueous solution of sulfuric acid containing the hydrochloric acid in the amounts mentioned.

The process of this invention may be employed to produce benzidine sulfate of high purity from benzidine hydrochloride containing excessive amounts of aniline and benzidine isomers, either from water solutions alone or from reaction masses such as described in U. S. Patent 2,233,128 containing any of the oxygen-containing non-acidic organic solvents described in that patent.

The following examples are given to illustrate the invention, with the understanding that the invention is not limited to the particular solutions of benzidine which are employed as the starting materials. As illustrated in Example 4, where the benzidine is produced in organic solvents these solvents may be eliminated prior to the precipitation of the benzidine sulfate or when desired the benzidine hydrochloride can of course be precipitated and isolated, and, when it contains an excessive amount of aniline or benzidine isomers, can be purified by the salting-out and acidification as illustrated in these examples.

*Example 1*

Benzidine hydrochloride was precipitated from a solution of crude benzidine hydrochloride as obtained according to Example 1 of U. S. Patent 2,233,128 and containing one part of benzidine, 9.5 parts of water, 0.17 part of aniline, 1.13 parts of isopropyl alcohol, 0.8 part of hydrochloric acid and 0.37 part of benzidine isomers at 65° to 70° C. over a 15 minute period with 1.72 parts of common salt. The slurry of benzidine hydrochloride was tested for completeness of precipitation by removing a sample, cooling to room temperature, filtering and adding additional salt. No precipitate formed, showing that precipitation was complete. To the slurry at 65°–70° C. was added over a 15 minute period 0.72 part of a sulfuric acid-hydrochloric acid solution prepared by mixing 1 part of sulfuric acid, 0.44 part of hydrochloric acid and 1.98 parts of water. After agitation of the mass for 30 minutes to be certain reaction was completed, the mass was filtered and the resulting filter cake was washed with hot water (preferably above 60° C.) until there was only a slight test for acidity on Congo red test paper. The benzidine sulfate on analysis contained 0.227% of aniline (based on the benzidine content of the filter cake).

Where the same benzidine hydrochloride solutions employed in this example were precipitated with 0.7 part of sulfuric acid solution containing 1 part of sulfuric acid to 1.5 parts of water and at the same temperature as employed in this example, the benzidine sulfate obtained after washing contained 1.44% of aniline, based on the benzidine content. In a comparative case where the same solution was precipitated with 1.72 parts of salt after which 0.65 part of a sulfuric acid solution containing 1 part of sulfuric acid in 1.63 parts of water were added and the temperature maintained at 65° to 70° C., the resulting benzidine sulfate upon analysis contained 0.79% of aniline, based on the benzidine content, and where no salt was used but where a dilute solution of sulfuric-hydrochloric acid was used containing 0.8 part of sulfuric acid, 0.36 part of hydrochloric acid and 1.86 parts of water, the precipitation being carried out at 60°–65° C. gave a benzidine sulfate containing 0.73% of aniline, based on the weight of the benzidine present.

Example 2

Except for a difference in concentration of starting solution, the identical procedure was follower as in Example 1, namely, benzidine hydrochloride was precipitated from a solution of benzidine hydrochloride containing 1 part of benzidine, 10.8 parts of water, 0.7 part of hydrochloric acid, 0.2 part of benzidine isomers, 0.04 part of aniline and 1.0 part of isopropyl alcohol at 65°–70° C. over a 30 minute period with 2.3 parts of salt. After about 45 minutes of agitation at 65°–70° C., 0.7 part of a sulfuric-hydrochloric acid mixture prepared from 1.0 part of sulfuric acid, 0.44 part of hydrochloric acid and 1.98 parts of water were added over a one hour period to the benzidine-hydrochloride slurry. The benzidine sulfate, isolated as in Example 1, analyzed 0.15% aniline, based on the benzidine content.

Example 3

Benzidine hydrochloride was precipitated from a solution of benzidine hydrochloride consisting of 1 part of benzidine, 0.2 part of aniline, 1.3 parts of isopropyl alcohol, 0.9 part of hydrochloric acid, 0.2 part of benzidine isomers and 11.3 parts of water at 66°–68° C. with 2.4 parts of salt over a one hour period. The slurry of benzidine hydrochloride was tested for completeness of precipitation as described above, and, after a two hour period at 66°–68° C., 2.1 parts of an acid mixture consisting of sulfuric acid, hydrochloric acid and water in the ratio of 36:10:54 parts, respectively, were added over a two hour period. The product, benzidine sulfate, was isolated by filtration and washed with hot water until only a slight test for acidity showed on Congo red test paper. The product analyzed 0.3% aniline (based on the benzidine content).

Example 4

A solution of benzidine hydrochloride containing 1 part of benzidine, 10.63 parts of water, 0.17 part of aniline, 0.8 part of hydrochloric acid and 0.37 part of benzidine isomers was heated to 65°–70° C. and 1.72 parts of common salt were added over a 15 minute period to precipitate the benzidine hydrochloride. To this slurry at 65°–70° C. was added over a 15 minute period 0.72 part of a sulfuric-hydrochloric acid solution prepared by mixing 10 parts of hydrochloric acid, 35 parts of sulfuric acid and 55 parts of water. After agitation of the mass for 30 minutes, it was filtered and the resulting filter cake was washed with hot water until there was only a slight test for acidity on Congo red test paper. On analysis the benzidine sulfate contained 0.17% of aniline, based on the benzidine content of the filter cake.

As illustrated in Example 4, the crude benzidine hydrochloride solution such as that employed in Examples 1 to 3 may be precipitated after removal of the alcohol or other volatile solvent employed, where such procedure is found desirable.

I claim:

1. A process for preparing benzidine sulfate from a relatively pure benzidine hydrochloride which comprises treating a solution of one part of benzidine hydrochloride in 9 to 15 parts of water at 60° to 80° C. with sufficient salt to completely precipitate the benzidine hydrochloride, then while maintaining the temperature at from 60° to 80° C. adding from 2 to 2.5 parts of an aqueous solution of sulfuric acid of from 30% to 40% concentration which contains dissolved therein from 0.1 to 0.5 part of hydrochloric acid per part of sulfuric acid.

2. A process for preparing benzidine sulfate directly from a crude benzidine hydrochloride without isolation from the solution in which the benzidine hydrochloride has been formed by the catalytic reduction of nitrobenzene in an oxygen-containing, non-acidic organic solvent and in which the hydrazobenzene has been inverted to the benzidine hydrochloride with aqueous hydrochloric acid, which solution contains from 9 to 15 parts of water per part of benzidine hydrochloride present, which comprises adding sufficient salt to the solution to completely precipitate the benzidine hydrochloride at a temperature of from 60° to 80° C., and while maintaining the temperature at from 60° to 80° C. adding from 2 to 2.5 parts of an aqueous solution of sulfuric acid of from 30% to 40% concentration which contains dissolved therein from 0.1 to 0.5 part of hydrochloric acid per part of sulfuric acid.

WILLIAM S. KRAUSE.

No references cited.